July 21, 1931.  I. MacDONALD  1,815,738
AUTOMOBILE PARKING AND STORAGE APPARATUS
Filed July 9, 1924  2 Sheets-Sheet 1

Witness:
J. J. Oberst,

Isaac MacDonald, Inventor,
By Emil Kenhart
Attorney

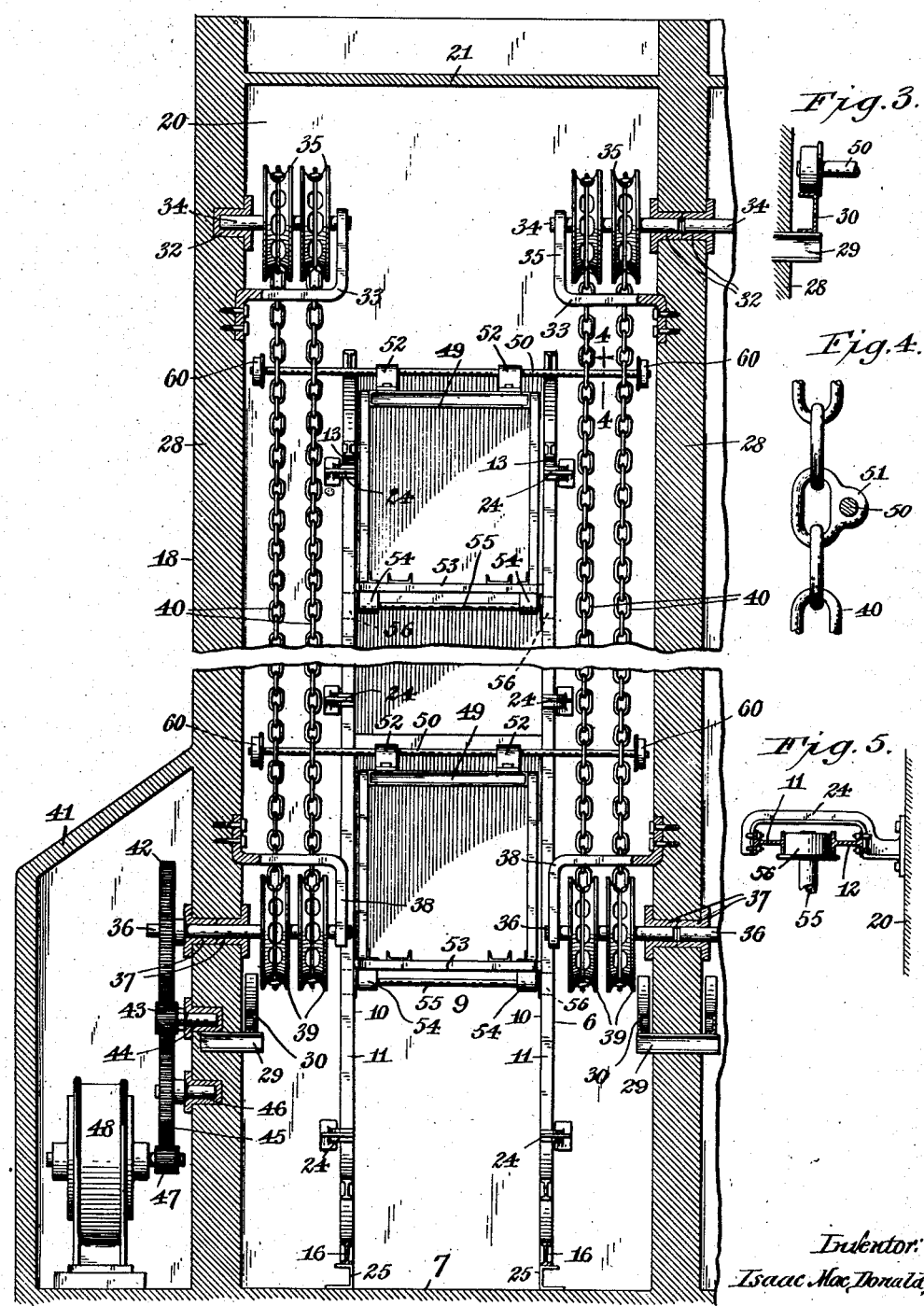

Patented July 21, 1931

1,815,738

UNITED STATES PATENT OFFICE

ISAAC MacDONALD, OF BUFFALO, NEW YORK

AUTOMOBILE PARKING AND STORAGE APPARATUS

Application filed July 9, 1924. Serial No. 725,041.

My invention relates to improvements in automobile parking and storage apparatus.

The primary object of my invention is to provide an apparatus whereby automobiles may be quickly and conveniently parked or stored therein, and as readily removed therefrom.

Another object of my invention is the provision of an apparatus which will occupy comparatively little space and which can be constructed to any desired height.

Another object of my invention is to provide an apparatus capable of use with or without an enclosure, and by means of which provision is made for parking, and if desired, for storing automobiles for a period of time; or the apparatus may be used solely for parking purposes, so termed when an automobile is stored for a period of less than twenty-four hours.

A further object of my invention is the provision of an apparatus adapted to be constructed on a comparatively narrow space, the depth of which may depend upon whether or not provision is made for time storage; and when no provision is made for time storage, said apparatus will be of small horizontal dimensions in all directions.

A further object is to provide an apparatus for parking, or both parking and storing automobiles, so constructed that it will have a single unit or a plurality of units, either with or without an enclosure for the same.

A further object of my invention is to provide an apparatus for parking automobiles in which an endless series of elevators are employed and on or in which elevators, the automobiles are adapted to be parked for short periods of time.

A further object of my invention is to provide an apparatus in which automobiles may be parked in a movable and endless manner so that any desired automobile parked in said apparatus may be brought to a given point to be quickly removed from the apparatus.

A still further object of my invention is the provision of a building having an endless series of movable automobile supporting elements and having an entrance opening and an exit opening, and means for moving said endless series of automobile supporting elements to permit two automobiles to be removed from the building at the same time.

With the above and other objects in view, the invention consists in an endless series of automobile supporting elements arranged to travel in a novel manner, and means for moving said endless series of elements to bring any desired element to a given point.

It also consists in an endless series of elevators, any one of which may be adapted to be brought to a given point for placing an automobile thereon, or removing one therefrom.

It also consists in two spaced elevator shafts connected at the top and bottom by passages or ways, an endless series of connected automobile supporting elements movable within said shafts and movable at the top passage or way from one of said shafts to the other, and in a reverse manner through the bottom passage or way, means for properly guiding and/or supporting said automobile supporting elements at all points in their course of travel and means for moving said elements to bring any one of the series to a given point.

It further consists in an apparatus or structure having an endless series of connected automobile supporting elements movable around an endless course, including two vertical stretches, and providing supporting or storage floors between said vertical stretches, and if desired, at one or both sides thereof, for storing automobiles, by utilizing any one of said automobile supporting elements as a means for elevating and delivering the automobiles to any of said storage floors.

It further consists in the novel features of construction, and in the arrangement and combination of parts to be hereinafter described and more particularly pointed out in the subjoined claims.

In the drawings:—

Fig. 2 is a vertical section taken on line

Figure 1:
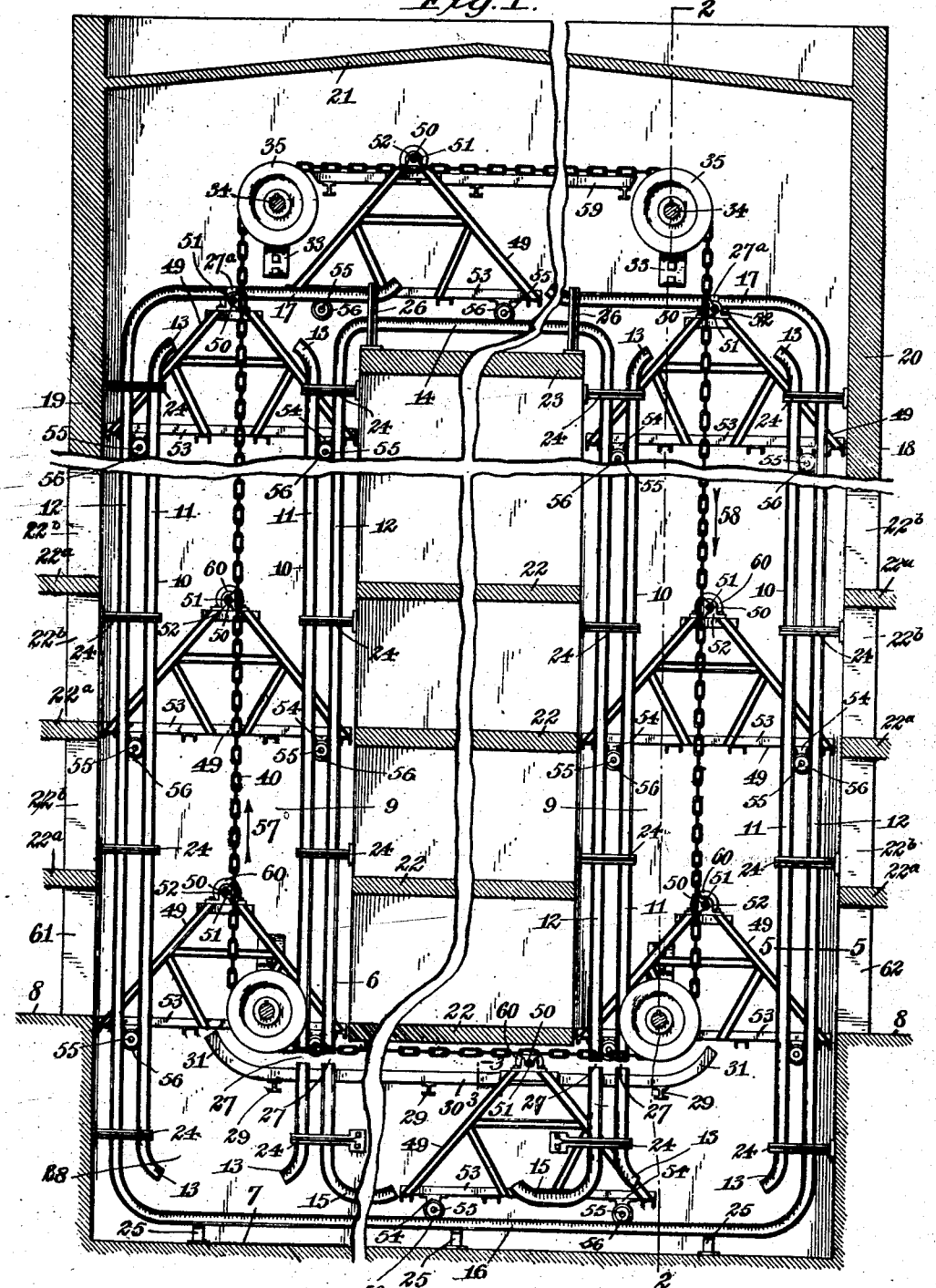
Fig. 1 is a vertical longitudinal section of a building, housing my improved apparatus and constructed for the purpose of storing automobiles in addition to the parking of automobiles within the housed apparatus.

2—2, Fig. 1, the elevators and chain sprockets being shown in elevation.

Fig. 3 is an enlarged vertical section taken on line 3—3, Fig. 1, showing one of the elevator supporting rollers traveling on one of the horizontal supporting guides.

Fig. 4 is an enlarged vertical section taken on line 4—4, Fig. 2, looking in the direction of the arrow crossing said line.

Fig. 5 is an enlarged horizontal section taken on line 5—5, Fig. 1.

In the embodiment of my invention shown in the drawings, I have illustrated the apparatus in one form, in which it is surrounded by building walls over which a roof is arranged, but I desire to have it understood that the apparatus is self-contained and does not depend upon a building structure for its operation. The apparatus may therefore be constructed in skeleton form without enclosing it, and by the term "skeleton form" I mean a structure built of structural steel or the like and adapted to be placed in the open, especially in the business sections of large cities where land is expensive and buildings of various kinds are erected to considerable height, owing to the high cost of the land; my apparatus being especially desirable in such sections, owing to the fact that in most cities parking of automobiles is prohibited on the streets. It is also desirable at manufacturing plants where land is occupied by plant buildings and little space left for the parking of automobiles.

Referring first to the parking apparatus, 6 designates a skeleton structure formed of structural steel or the like and supported upon a suitable foundation, preferably beneath the level of the ground. In Fig. 1 of the drawings I have shown the supporting floor 7 of the structure a distance beneath the ground level 8, and I preferably excavate so that the automobiles may be driven into the apparatus and out of the same on the level of the ground.

As this apparatus is intended to be constructed so that it will rise a considerable distance above the ground, suitable pilings, piers or other foundation construction, not shown in the drawings, may be found necessary in some instances, and in such cases the structure will be supported by such foundation.

The skeleton structure 6 comprises two vertical elevator shafts 9, which are spaced apart any desired distance, each shaft having four pairs of roller guides 10 formed of suitable structural steel or the like, the individual members of which may be of I-formation in cross section, and are vertically disposed. Each of the roller guides may be said to be constructed of uprights 11, 12, and these guides are spaced apart in two directions so that a roller guide is arranged at each of the four corners of a rectangular space, horizontally considered. The uprights 11 form the inner members of the roller guides, while the uprights 12 form the outer members thereof. Opposite ends of the inner members 11 are curved inwardly toward the center of the elevator shaft in which they are located, as at 13. The upper ends of the outer members 12 of the roller guides at the inner corners of the elevator shafts are connected together by horizontal roller guides or guide members 14. These roller guides or guide members may be in piece with said inner members, or separate parts connected in any approved manner to the upper ends of said inner members. The lower ends of said outer members are directed outwardly from the shafts in which they are located toward the vertical center of the space between the two elevator shafts, as at 15, and it will be plain, upon examination of Fig. 1, that the outer members at the inner corners of the two spaced elevator shafts are of substantially inverted U-formation. The outer members at the outer corners of the elevator shafts are connected together at their lower ends by horizontal roller guides or guide members 16, while their upper ends are directed inwardly over the shafts in which they are located and extend over the inwardly-curved upper ends of the inner members 11 to form horizontal roller guides or guide members 17, the ends of which are spaced apart.

In the preferred construction shown in the drawings, the apparatus is enclosed within a housing or building 18 having a wall 19 at one side of the structure, a wall 20 at the other side thereof, and a roof 21 covering the complete apparatus. In the space between the two elevator shafts, a plurality of storage floors 22 are provided, the lowermost of which is in the plane of the ground level 8. The remaining floors are arranged in spaced relation above said lowermost floor, the uppermost floor being spaced from what may be termed a supplemental roof 23.

Suitably secured to the walls 19, 20, which may be considered the side walls of the building, and to that portion of the building between the elevator shafts, are horizontally-disposed brackets 24 to which the several members of the roller guides are secured; and secured to the supporting floor 7 are suitable supports 25 on which the horizontal roller guide members 16 are supported. Among other supports which may be used to support the various members of the roller guides are brackets 26 rising from the supplemental roof 23. It is, however, to be understood that these several members may be otherwise supported.

It is to be noted that the several members of the roller guides at the inner sides of the elevator shafts are separated near their lower ends by clearance spaces 27, for a purpose to appear hereinafter, and that the horizontal roller guides or guide members 17 directed inwardly over the elevator shafts from the upper ends of the outer members at the outer corners of the elevator shafts are also separated between their ends by clearance spaces 27ª.

Extending from the end walls 28 of the building structure in a plane beneath the lower storage floor 22, are supports 29 on which rest supporting guides 30, said supporting guides extending from a plane passing through the center of one elevator shaft to a plane passing through the center of the other and having their ends curved upwardly, as at 31. Journaled in bearings 32 in the end walls 28 and in brackets 33 secured to said end walls are sprocket shafts 34, four in number and on each of these shafts are secured chain sprockets 36 arranged in pairs. In vertical alinement with the sprocket shafts 34, approximately on the level of the lowermost storage floor 22, four additional sprocket shafts 36 are arranged, which are journaled in bearings 37 in the end walls 28, and in brackets 38 secured to said end walls. Secured to said sprocket shafts 36 are chain sprockets 39. It is to be understood that there are four sprocket shafts supported from each end wall 28 in rectangular relation, and that each shaft has two chain sprockets secured thereon.

Around the chain sprockets 35 and 39 at each end wall, endless chains 40 are passed, two such chains being provided at each side of the structure, as clearly shown in Fig. 2. One of the sprocket shafts, preferably one of the lower shafts, is the drive shaft, and in Fig. 2 this shaft is shown extending out through one of the end walls 28 into a housing 41 forming part of the building structure. On said shaft within the housing 41 a gear wheel 42 is secured, which meshes with a pinion 43 fastened to a shaft journaled in said end wall, as at 44, and this pinion in turn meshes with a gear wheel 45 secured to a shaft also journaled in said end wall, as at 46. The gear wheel 45 meshes with a pinion 47 on the shaft of a motor 48.

The two chains at one side of the structure are therefore driven directly from the motor, while the other two chains at the other side of said structure are driven indirectly, as will be clear from the description to follow. It is of course understood that the chains may be otherwise driven, but it is desirable that the prime mover, in this instance the motor 48, be under direct control of an attendant so that the chains may be moved to any desired degree and be capable of stopping after the desired movement has been imparted thereto.

As will be clear from the examination of Fig. 2 of the drawings, the endless chains 40 are arranged in pairs between the skeleton structure and the end walls of the building and where no building is used in connection with the skeleton structure, steel or like structural supports will be substituted for the end walls and the sprocket shafts 34 and 36 journaled therein.

Elevators 49, broadly considered as automobile supporting elements, are secured to the endless chains 40, and these are arranged in an endless series spaced apart any desired distance, each elevator being preferably of a height not to exceed the space between the floors 22 of the intermediate structure, where such a structure is employed.

Each of the elevators has a supporting shaft 50 rotatable in extensions 51 on certain links of the endless chains 40, each of the four endless chains being provided with horizontally-alined extension links at regular intervals so that each supporting shaft is given substantial bearing, capable of supporting an elevator, and its carried weight. The elevators have blocks 52 secured to their upper ends in which the shafts 50 are journaled. Owing to the supporting shafts 50 being journaled in the four endless chains, the two pairs of chains at opposite sides of the apparatus are connected together and the drive of the chains at one side of the apparatus therefore cause the chains at the other side thereof to operate in unison therewith.

By reason of this arrangement each of the elevators has a floor 53 of a size to receive thereon the largest automobile or truck now in use, and to the under side of said floor, brackets 54 are secured which are arranged in pairs near each end of the floor, each pair having a guide shaft 55 journaled therein.

Secured to said guide shafts are guide rollers 56 which travel in the roller guides 10 between the uprights 11 and 12. The vertical stretches of the endless chains are at opposite sides of the elevator shafts substantially in a plane passing centrally through the said shafts, and the elevators attached thereto move upwardly in one elevator, as indicated by the arrow 57, and downwardly in the other, as indicated by the arrow 58.

In order to prevent sagging of the upper stretches of chains from one pair of chain sprockets 35 to the other, supporting guides 59 are secured to the end walls of the housing, and each of the supporting shafts 50 has guide and supporting rollers 60 at each end thereof, which roll in contact with the supporting guides 59 so that the elevators are supported from said supporting guides instead of from the endless chains while traveling through the elevator way extending from the upper end of one elevator shaft to the other. These guide and supporting rollers 60 also travel in contact with the supporting guides 30 at the bottom of the structure when passing through the elevator way extending from the lower end of one elevator shaft to the other. When the elevators travel from the lower end of one elevator shaft to another the supporting shafts 60 pass through the clearance spaces of the vertical roller guides 10 at the inner corners of the elevator shafts, while the guide and supporting rollers 60 travel in contact with said supporting guides 30. When the elevators travel from the upper end of one elevator shaft into the upper elevator way, and when moving out of said elevator way into the upper end of the other elevator shaft, the supporting shafts 50 pass through the clearance spaces 27$^a$ formed in the horizontal roller guides or guide members 17. Therefore, by providing the clearance spaces 27 and 27$^a$, all movable parts of the apparatus are free to travel without coming in contact with any obstructions.

Attention is also invited to the fact that the guide rollers 56 at the bottoms of the elevators travel in contact with the horizontal guide members 14 connecting the outer uprights or members 12 of the roller guide at the inner corners of the elevator shafts when the elevators travel from the upper end of one elevator shaft to the upper end of the other, and when said elevators travel from the lower end of one of said elevator shafts to the other, said guide rollers 56 travel in contact with the horizontal guide member 16 at the bottom of the structure.

The roller guides or guide members in the ways serve in addition to prevent the sagging of the chains while passing through said ways, to relieve the chains of the weight of the elevators and at the same time guide them in a straight horizontal course without possibility of lateral movement and in true relation to their path of travel through the shafts.

That portion of the building positioned between the elevator shafts may have any desired depth; this being governed by the distance between elevator shafts. If desired, additional storage floors may also be arranged at opposite sides of the structure, as indicated in Fig. 1, where the several additional storage floors are designated by the reference character 22$^a$; access to which may be had through openings 22$^b$ formed in the side walls 19, 20. Ordinarily, this additional storage space will not be used.

One of the side walls 19 has an entrance opening or "drive-in" 61 and the other has an exit opening or "drive-out" 62, both of which may, however, be closed by suitable doors if desired. These may also be termed "drive-on" and "drive-off" points under their broader meaning, since the principle involved may be employed under modified arrangement without resorting to the use of walls having entrance and exit openings. When additional storage floors are not desired, the walls 19 and 20 are built up solid from the openings 61, 62, respectively, thus eliminating the openings 22$^b$ in said walls leading to the additional floors 22$^a$.

It is of course to be understood that the drawings are merely representative of my invention and may be varied in various ways. In the drawing the elevators are spaced apart so that one elevator is in line with each second story of storage floor, but it is quite clear that the elevators may be so arranged that one elevator is in line with each storage floor, or the elevators may be otherwise spaced apart, regardless of their relation to the floors of the storage space. It, however, is desirable to have them so spaced that when one elevator at one side of the structure is in line with the ground level 8 at the entrance opening or drive-in 61, another will be in line therewith at the exit opening or drive-out 62.

It is the intention to so operate the apparatus that an elevator will at all times be in line with the entrance opening or drive-in 61 of the building structure, or at least in line with the ground level 8 when the apparatus is used in skeleton form without the building structure.

A party desiring to park, or to store his automobile, drives through the entrance opening or drive-in 61 directly onto the elevator in line therewith. The attendant operates the motor to move the series of elevators so that they travel upwardly in one elevator shaft and downwardly in the other. If the automobile driven onto the elevator being moved upwardly is to be stored for a period of time, the elevator containing the automobile is brought at a standstill in line with any of the floors 22 that may provide proper storage space for the automobile. The driver will then drive the automobile from the elevator onto the floor in the desired position. Should it be desired to park the automobile, the driver leaves the automobile before the elevator starts in its upward course, since, in such cases, the automobile will be left on the elevator until called for. In all cases, the next unoccupied elevator of the series is brought in line with the entrance opening or drive-in 61 awaiting the next automobile to be parked, when the same operation is repeated.

The elevators may be numbered or otherwise designated so that when the owner calls for his automobile after an interval of time, he need only inform the attendant that his automobile is parked on the elevator having a certain number. When the owner of the automobile calls for the same the attendant operates the apparatus to bring the desired elevator in line with the exit opening or drive-out 62 so that the owner can drive the automobile from the elevator out through said opening or drive-out. In the event of an automobile being called for which is stored within the storage space between the two elevator shafts, or in the storage space at the side of either elevator shaft, it is simply necessary to ascertain on what floor the automobile is stored, after which the attendant operates the apparatus to bring a vacant elevator in line with said floor. The desired automobile is then driven from the storage floor onto the elevator, after which the attendant again operates the apparatus and continues to cause the series of elevators—some with and others without automobiles thereon—upwardly and over the top, and thence downwardly until the elevator bearing the desired automobile is brought in line with the exit opening or drive-out 62; but if desired, the apparatus can be made so that the endless chains may be reversed, in which case the opening 61 may serve as both the entrance and exit for the apparatus.

In the event of a fire taking place, the attendant may operate the apparatus so that the elevators will be brought in line with both the entrance and exit openings, one after the other, and the attendants at the entrance and exit openings can quickly remove the cars from the various elevators, as they are brought to said openings. In such cases the apparatus may be operated so that alternate elevators will stop at the exit opening, with the result that the automobiles on alternate elevators will be taken out of the structure at the exit opening, while those passing the exit opening will be brought in line with the entrance opening and at this point can be quickly removed from the structure.

These apparatuses can be arranged end to end, as shown in Fig. 2, and may also be arranged side by side, as shown in Fig. 1, the storage spaces being arranged between the elevator ways of each apparatus and also between adjoining apparatus, as will be clear upon examination of Fig. 1. However, the widest use of my invention is believed to be that in which arrangement for parking only is provided, and in such cases the apparatus need not be enclosed. The height of the apparatus is practically unlimited, and an apparatus having the height of a ten story building would provide facilities for parking a comparatively large number of automobiles. This would require a ground space approximating less than the length of three cars and a width approximating less than the width of two cars; thus making it possible to park a large number of automobiles on comparatively small ground space. It is of course to be understood that where storage space is provided between the elevator shafts, or at one side of an elevator shaft, it is not necessary for the attendant or owner of the automobile to remain on an elevator any longer than necessary to place the car thereon or to remove the same therefrom when on the level of the ground or driveway, approaching or leaving the apparatus.

My invention lends itself admirably for garage purposes, for both parking and storage, and by means of the same, considerably greater service is furnished customers and greater capacity for storage and parking space is provided than in structures now in use for such purposes occupying like ground space.

Having thus described my invention, what I claim is:—

1. An apparatus of the kind described, having two elevator shafts, elevator ways connecting said shafts at the top and bottom, storage space divided into floors between said elevator shafts, a series of elevators movable through said shafts and ways, and means for causing said elevators to travel and for causing any one of said elevators to be stopped in line with any desired floor of said storage space.

2. An apparatus of the kind described, comprising two elevator shafts, two elevator ways connecting said shafts at the top and bottom, storage spaces at opposite sides of said apparatus and also between said elevator shafts, a series of connected elevators adapted to travel through said shafts and ways, and means to cause said elevators to travel and to stop the same at any desired points.

3. An apparatus of the kind described, having two sets of uprights forming two elevator shafts, the uprights of each shaft being at the corners thereof and being arranged in pairs at each corner to form roller guides, certain of said uprights being connected at the top and bottom and others being directed inwardly to form roller guides, elevators provided with guide rollers traveling along said roller guides, chains connecting said elevators together, supported chain sprockets over which said chains are passed, and means for rotating certain of said sprockets to cause said elevators to travel along said roller guides.

4. An apparatus of the kind described, comprising a steel structure providing two elevator shafts, said structure having uprights at each of the four corners of each shaft, a horizontal roller guide in a plane above the upper ends of said shafts, a horizontal roller guide at the lower ends of said shafts, chain sprockets arranged at high and low points of the apparatus, endless chains passing around said chain sprockets, elevators connected to said chains in spaced relation, guide rollers on said elevators adapted to travel in contact with said uprights and with said roller guides, and means for rotating at least one of said chain sprockets to cause said chains to travel.

5. An apparatus of the kind described, comprising a steel structure having individual members arranged to form two elevator shafts and elevator ways connecting the upper and lower ends of said shafts, spaced connected elevators adapted to move through said shafts and ways, means to control the movements of said elevators, and means for parking automobiles between said elevator shafts.

6. An apparatus of the kind described having end and side walls, an entrance opening in one of said side walls, an exit opening in the other side wall, an elevator shaft extending vertically along each of said side walls, elevator ways connecting the upper and lower ends of said shafts, a series of connected elevators adapted for movement through said shafts and ways, and means for moving and controlling the movement of said elevators to bring any desired elevator in line with said entrance opening, or in line with said exit opening.

7. An apparatus of the kind described having end and side walls, an entrance opening in one of said side walls, an exit opening in the other side wall, an elevator shaft extending vertically along each of said side walls, elevator ways connecting the upper and lower ends of said shafts, a series of connected elevators adapted for movement through said shafts and ways, and means for moving said elevators and bringing two of said elevators in line with said entrance and exit openings.

8. An apparatus of the kind described, comprising two elevator shafts, each formed of members arranged in pairs at each corner of the shaft to form guide rollers, the inner of each pair of members being curved inwardly at their upper and lower ends toward the center of said shaft, the upper ends of the outer members at the outer corners of said shaft being directed inwardly over said shafts to form a roller guide extending over the inwardly curved upper ends of said inner members, the lower ends of said outer members of both shafts being connected at their lower ends to form a roller guide, the outer members at the inner corners of both shafts being connected together at their upper ends to form roller guides and the lower ends thereof being directed inwardly toward the center of the space between said shafts, supporting guides in a plane above said shafts, supporting guides extending from the lower end of one of said shafts to the other, horizontally-spaced chain sprockets at each side of the apparatus in a plane above the upper ends of said shafts, horizontally-spaced chain sprockets at each side of the apparatus near the lower ends of said shafts, a sprocket chain passing over the chain sprockets at each side of the apparatus, elevators spaced apart, guide rollers at the lower end of each elevator adapted for traveling movement in and along said roller guides, a shaft at the upper end of each elevator journaled in alined links of said chains, supporting rollers at the outer ends of said shafts adapted to travel along said supporting guides at the top and bottom of the apparatus, and means for rotating at least one of said chain sprockets to cause said chains and its connected elevators to travel through said shafts, along the top of the apparatus from one shaft to the other and along the bottom in a reverse manner.

9. An apparatus of the kind described, comprising two elevator shafts, elevator ways connecting the upper and lower ends of said shafts, storage space between said elevator shafts, a series of spaced elevators adapted to travel upwardly in one of said shafts and downwardly in the other and in reverse manner through said elevator ways, and means for connecting said elevators together and for causing them to travel in unison.

10. An apparatus of the kind described, comprising two elevator shafts and elevator ways connecting said shafts at the top and bottom, a drive-in and a drive-out in a plane above the elevator way at the bottom of said apparatus, elevators in spaced relation, means for guiding said elevators in said shafts and ways, means for connecting said elevators together and supporting the same within said shafts and ways, means in said ways for additionally supporting said elevators when passing therethrough, and means for causing said connecting means to travel.

11. An apparatus of the kind described having two elevator shafts and elevator ways connecting the upper and lower ends of said shafts, said shafts and ways being formed of structural steel members providing elevator guides and supports, elevators within said shafts and ways arranged in spaced relation, storage space between said elevator shafts divided into floors and means for causing said elevators to travel through said shafts and ways in unison.

12. An apparatus of the kind described, comprising an endless series of automobile supporting elements and storage space surrounded by said series of automobile supporting elements, and means for moving said series of automobile supporting elements and stopping the same to bring any one of said elements in line with a given point of said storage space.

13. An apparatus of the kind described, comprising an endless series of automobile supporting elements, a storage space surrounded by said series of elements, a storage space at each side of said series of automobile supporting elements, and means for moving said automobile supporting elements in unison and for stopping the same to bring any one of said elements in line with any given point of either of said storage spaces.

14. An apparatus of the kind described having two sets of uprights forming two elevator shafts, the uprights of each shaft forming roller guides, certain of said uprights being connected at the top and bottom and others being directed inwardly to form roller guides at the top and bottom, elevators provided with guide rollers adapted to travel along all of said roller guides, flexible elements connecting said elevators together, rotatable elements over which said flexible elements are passed, and means for causing said elevators to travel along said roller guides.

15. An apparatus of the kind described, comprising a structure providing two elevator shafts, said structure having uprights serving as vertical roller guides, horizontal roller guides extending from the upper end of one of said shafts to the upper end of the other shaft, horizontal roller guides extending from the lower end of one of said shafts to the lower end of the other shaft, rotatable elements arranged at high and low points of the apparatus, endless flexible elements passing around said rotatable elements, elevators connected to said flexible elements adapted to travel in contact with said vertical and horizontal guides, and means to cause said flexible elements to travel.

In testimony whereof I affix my signature.

ISAAC MacDONALD.